United States Patent [19]
Dolan et al.
[11] Patent Number: 4,827,246
[45] Date of Patent: May 2, 1989

[54] HYDROCARBON AND WATER LEVEL SENSOR SYSTEM USED TO MONITOR UNDERGROUND STORAGE SITES

[76] Inventors: James P. Dolan; Patrick M. Dolan, both of 4119 NE. 96th St., Seattle, Wash. 98115

[21] Appl. No.: 197,985
[22] Filed: May 24, 1988
[51] Int. Cl.[4] ........................ G08B 19/00; G01F 23/00
[52] U.S. Cl. .................................... 340/521; 340/604; 340/605; 340/612; 340/618; 200/61.04; 73/304 R; 136/206; 323/906; 116/109; 116/227
[58] Field of Search ............... 340/521, 612, 604, 605, 340/618; 73/293, 73, 304 R, 304 C; 200/61.04; 323/906; 136/243, 206; 324/61 R, 61 P, 65 R, 65 P; 436/139, 141; 116/109, 227

[56] References Cited

U.S. PATENT DOCUMENTS 4,351,642 9/1982 Bonavent et al. .................. 340/604
4,663,614 5/1987 Kauchwerger ..................... 340/605
4,682,156 7/1987 Wainwright ........................ 340/605

*Primary Examiner*—Donnie L. Crosland
*Attorney, Agent, or Firm*—Graybeal, Jensen & Puntigam

[57] ABSTRACT

Combination hydrocarbon and water level sensor systems for use in connection with underground storage sites, such as gasoline storage tanks, industrial waste sites, and the like, with a solar cell power source and an LCD display located above ground and providing directly viewable indication of the presence or absence in the underground environment of "HYDROCARBON" and/or "WATER", with the absence of such being indicated by "OK". In the preferred form, a pod containing an adsorptive type hydrocarbon gas sensor and a galvanic cell type liquid water sensor is suspended by electrical cable means from a well cap in which the solar cell and LCD display are installed.

9 Claims, 3 Drawing Sheets

HYDROCARBON AND WATER LEVEL SENSOR SYSTEM USED TO MONITOR UNDERGROUND STORAGE SITES

BACKGROUND OF THE INVENTION

1. Field of the Invention

This invention relates to monitoring systems for indicating the presence or absence of hydrocarbon vapor and water vapor in subterranean locations and more particularly relates to a monitoring system for use in conjunction with underground hydrocarbon storage tanks, industrial waste sites, and the like, with the detection of the presence of a hydrocarbon being by an adsorptive gas vapor sensor and the presence of liquid water being detected by a galvanic cell, both such sensors being powered by a solar cell so that the system does not require any external power.

2. Description of the Prior Art

Combination hydrocarbon and water level sensors are broadly known. Adsistor Technology, Inc. of Seattle, Wash. has for some time manufactured and marketed such a sensor system involving an adsorption type hydrocarbon vapor sensor and a magnetic proximity switch-float assembly for water level detection, the sensor and switch-float being housed in a slotted PVC pipe, the assembly being about seven inches long and two inches in diameter. The float on encountering sufficient water rises and opens the normally closed magnetic proximity switch. The assembly is attitude sensitive, requiring that it be arranged substantially vertically in order for the float to operate and the gas sensor and associated circuitry are powered by an external 12-volt battery.

Also known is the monitoring system disclosed in Pugnale et al U.S. Pat. No. 4,561,292, which system is used for double-wall underground storage leak detection but involves a completely different approach with leak detecting liquid filling the space between the tank walls and extending to a liquid level above ground.

Maltby et al U.S. Pat. No. 4,208,909 and Larson et al U.S. Pat. No. 4,389,889 broadly involve detecting two parameters, i.e. fluid level and the presence or composition of the fluid, with the fluid level sensor including conductive electrodes. However, Larson et al differentiates between water and other liquid fuel by relative conductivity and Maltby et al measures liquid composition and liquid level with composition measuring circuitry being utilized to provide a compensated or actual liquid level indication.

Harper U.S. Pat. No. 3,678,749, Kankura et al U.S. Pat. No. 4,188,826, Hinshaw et al U.S. Pat. No. 4,279,078 and Tokard U.S. Pat. No. 4,377,550 all disclosed galvanic type liquid level detectors.

SUMMARY OF THE INVENTION

There is need for a simple, reliable, low-power, easily installed and easily replaceable hydrocarbon leakage and water accumulation detection system for use in underground environments such as hydrocarbon storage tanks as widely utilized in gasoline and other retail filling stations and in industrial waste sites for example, and it is an object and feature of the present invention to provide such a system in which the detection instrument is internally self-contained and requires no batteries or AC power, with an essentially endless shelf-life when stored.

It is a further related object and feature of the present invention to provide such a monitoring system which is especially adapted to be readily installable on the top of the well-pipe or standpipe which is commonly used adjacent and as part of an underground gasoline tank and diesel tank installation and which give ready, instantaneous and continuing indications of hydrocarbon gas vapor and/or water conditions in the underground region adjacent the tank.

It is a further object and feature of the invention that its gas vapor and water sensor assembly is fabricated as a plug-in type unit for ready testing or replacement, and its configuration and manner of operation are such that it is not attitude sensitive in use.

These and other objects, features and advantages of the invention will be apparent to those skilled in the art to which the invention is addressed, giving due consideration to the accompanying drawings and following description of a particular, preferred embodiment thereof.

DESCRIPTION OF THE PREFERRED EMBODIMENT

The preferred embodiment illustrated in the accompanying drawings and discussed below is expressly designed to function as a solar powered, underground gasoline or other hydrocarbon storage tank leak detector system for use at hydrocarbon retail outlets such as gasoline filling stations. The system is designed to operate at very low light levels (i.e. indirect daylight, light available from heavy overcast conditions, flashlights, etc.) as well as at higher light levels. Current code requirements for gasoline and like underground storage tanks require as part of the installation one or more monitoring wells which are typically vertical standpipes into the ground (commonly pea gravel) around the tank. Such standpipe, also known as well-pipe, is usually a 4 inch i.d. PVC pipe at least about twelve feet long extending from a level about the same level as the bottom of the tank to a level at or slightly below the ground surface.

The detector system illustrated in the accompanying drawings comprises what may be termed a well cap WC designed to snugly fit on the top of the tank installation well-pipe (not shown). A sensor pod SP is suspended from well cap WC by electrical cable EC. The electrical cable EC is of a length to position the sensor pod SP at or near the bottom of the well-pipe at about the same level as the bottom of the storage tank.

Figure 1:
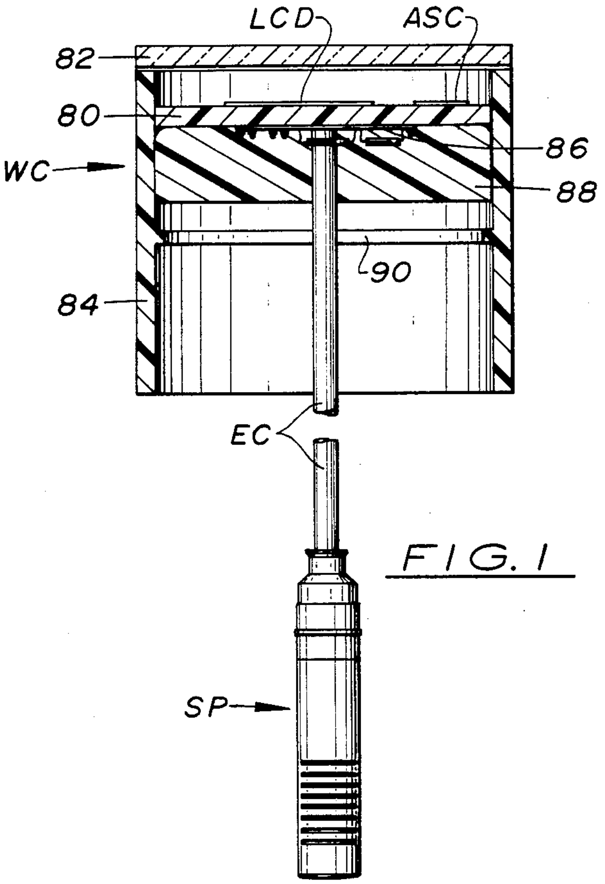
FIG. 1 is a view partly in cross-section and partly in side elevation of the well cap and sensor pod of a preferred form of the invention, designed for use as an underground gasoline storage tank leak detector.
Figure 2:
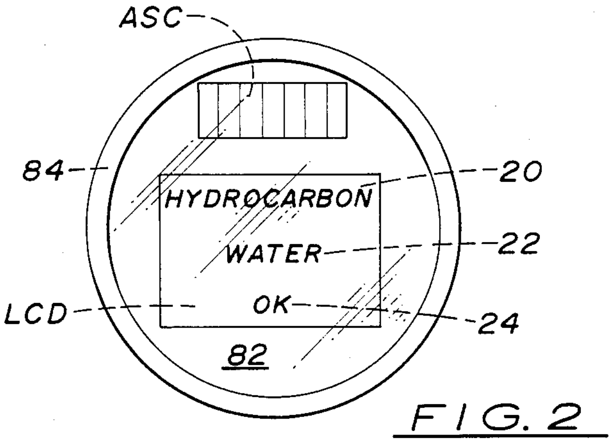
FIG. 2 is a top plan view of the well cap shown in FIG. 1.
Figure 6:
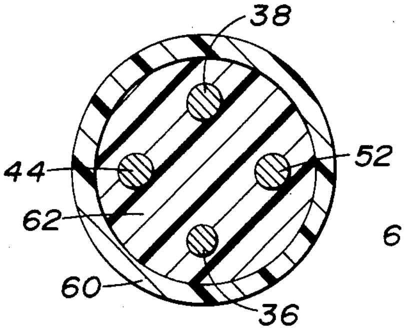
FIG. 6 is a cross-sectional view of the sensor pod shown in FIG. 3, taken, substantially along line 6—6 thereof.
Figure 5:
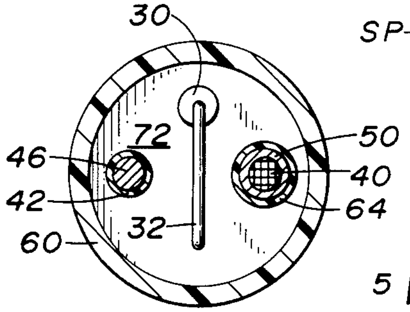
FIG. 5 is a cross-sectional view of the sensor pod shown in FIG. 3, taken substantially along FIGS. 5—5 thereof.
Figure 4:
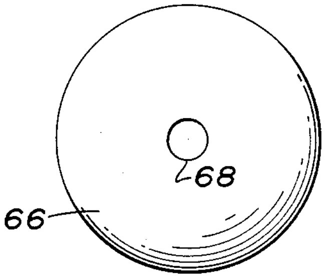
FIG. 4 is a top plan view of the sensor pod shown in FIG. 3, taken substantially along line 4—4 thereof.
Figure 3:
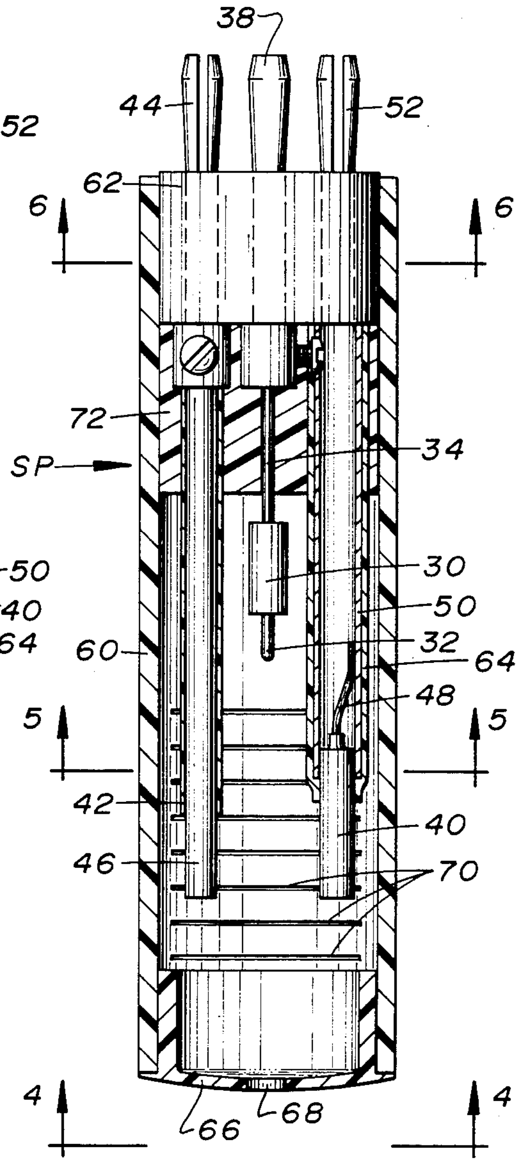
FIG. 3 is a view partly in cross-section and partly in side elevation of the sensor pod shown in FIG. 1, taken on an enlarged scale.
Figure 7:
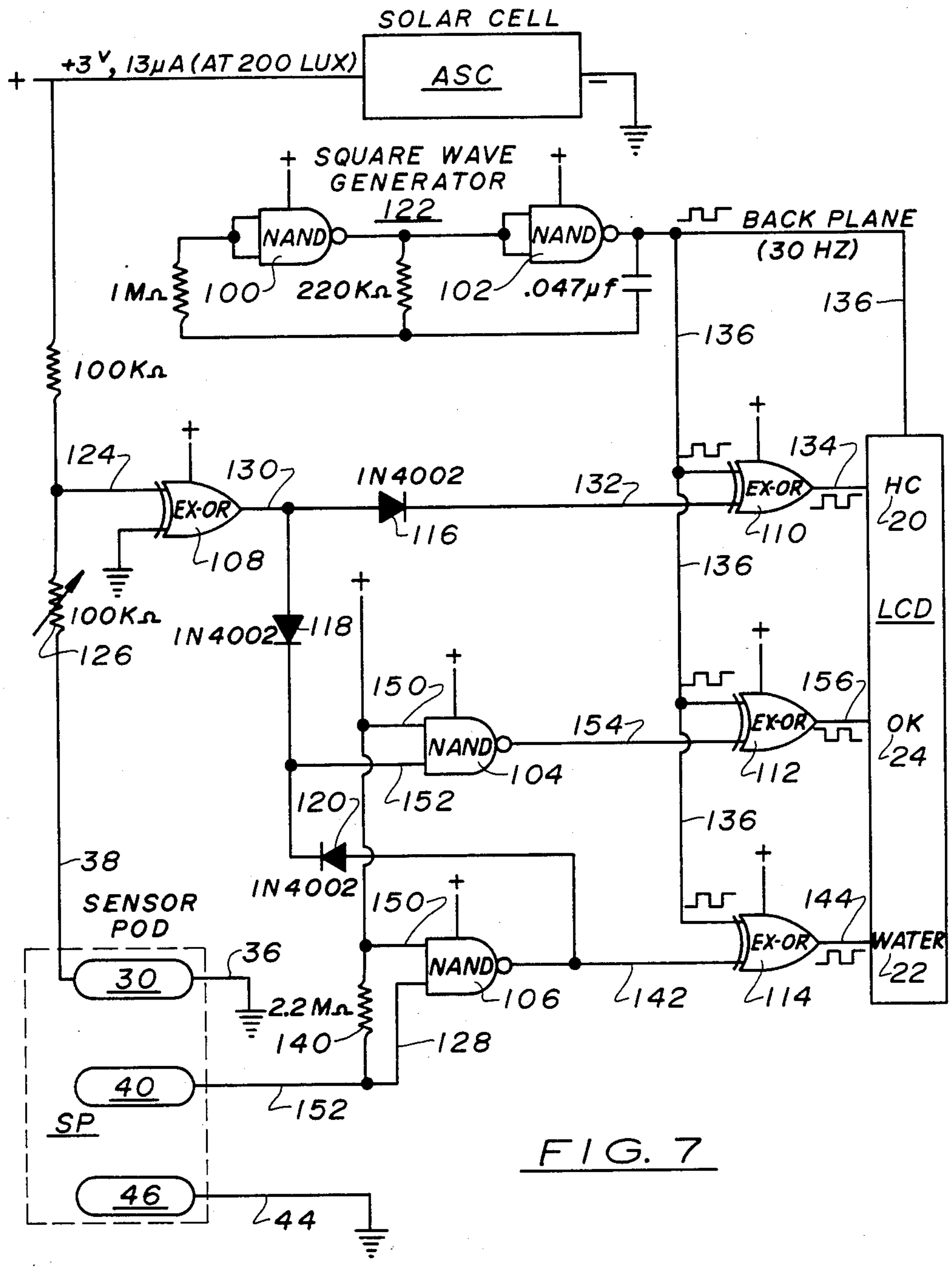
FIG. 7 is a schematic of the electrical circuit components of the detector system including the well cap and sensor pod shown in FIGS. 1-6.

An LCD display, designated LCD in FIGS. 1, 2 and 7 operates in conjunction with the sensor pod SP and associated electronic circuitry to annunciate any one of three conditions; (1) display of the word "HYDROCARBON" as indicated in FIG. 2 at 20 and meaning that the concentration of hydrocarbon vapor in the standpipe has exceeded an acceptable limit; (2) display of the word "WATER", as indicated in FIG. 2 at 22, meaning that the pod SP has become submerged in ground water and therefore must be raised to a higher level in the well-pipe; and (3) display of the letters "OK" as indicated in FIG. 2 at 24, meaning that neither of the previous conditions ("hydrocarbon" presence or "water" presence) exists and that the storage tank environs is in compliance with requirements insofar as lack of the presence of hydrocarbon vapor or excessive water level.

As will be apparent from the following discussion of the further details of the system, the system contains no batteries and requires no external connection to electrical power in order to operate. It is powered entirely by light energy. In operation the detector system may suitably be checked by removing the cast-iron cover plate which typically covers the top of a monitoring standpipe, thus allowing light to fall on the amorphous silicon solar cell ASC, which is so designated in FIGS. 1, 2 and 7.

Light falling on the solar cell ASC during exposure of the well-cap WC to light activates the system, with the display LCD giving the viewer a direct reading as to the water level and hydrocarbon vapor condition then existing at the bottom of the well-pipe.

The independence of the system from any external power requirement is made possible by use of a combination of CMOS integrated circuitry and sensors with extremely low power requirements. The components that characterize the device to this end include an amorphus silicon solar cell ASC, the use of which is preferred over a standard solar cell in that an amorphous silicon solar cell is able to produce relatively high voltage at relatively low light levels with very low current.

For hydrocarbon vapor detection the disclosed system prefers to utilize a gas adsorbing sensor of a type having electrically conductive adsorbent particles resiliently embedded in a surface and forming an electrically conductive path through the sensor, the resistance of which varies in response to the presence of an adsorbate medium exposed to the particles, such as the sensor disclosed and claimed in Dolan U.S. Pat. No. No. 4,224,595. In this context, the sensor pod SP comprises the adsorption sensor element 30, interconnected by conductors 32, 34 to pod prongs 36, 38.

In the system disclosed, the pod SP also comprises components making up a galvanic water sensing cell, the elements of which are zinc rod 46 partially encased in heat-shrink tubing 42 and electrically connected to prong 44 of the pod SP, and carbon rod 40 electrically connected through conductor 48 and brass tubing 50 to prong 52 of the pod SP as shown in FIGS. 3-6. The other components of the pod SP comprise an outer casing 60, suitably of half-inch PVC pipe, an ABS/brass 4-contact trailer connecter 62 of conventional form per se which includes the various prongs 36, 38, 44, 52, heat-shrink tubing 64 encasing the brass tubing 50, a molded cap 66 with a center hole 68, and a series of slots in the casing 60, certain of which are indicated at 70, the hole 68 and the slots 70 permitting water and vapor ingress and egress. So designed, the sensor pod SP is completely submersible and its operation does not depend on being in any particular attitude in the ground.

Preferably, the internal area of the pod SP adjacent the connections of the internal components to the base portion 62 thereof is filled with an encapsulating compound as indicated at 72.

Considering in more detail the nature of the well cap WC, and as was indicated, the portion thereof viewable at the top includes the display LCD and the solar cell ASC which are physically mounted on a PVC plate 80, above which a clear cover plate 82, suitably of clear acrylic plastic, is sealed. The external casing 84 is suitably PVC tubing, and the CMOS ICs and associate circuit components responsive to the solar cell and activating the display LCD are suitably mounted on a circuit board 86 arranged below the display LCD and solar cell mounting plate 80 and encapsulated internally of the well cap WC and retained therein by encapsulating compound 88. An internal rib 90 is suitably provided within the casing 84, against which the top of the well-pipe is engaged with the well-cap WC of the system in place.

The electrical circuitry of the preferred embodiment of the invention is shown schematically in FIG. 7. The values of the resistor and capacitor components are as shown. The solar cell ASC is suitably amorphous silicon solar cell type 2055-5 available from Keyocera America, Inc., San Diego, which has a 3 volt output at 13 microamps at 200 lumens per square meter (LUX) illumination intensity. The display LCD is suitably a Hamlin Part No. 7113-363-480 obtainable from Hamlin, Inc. of Lake Mills, Wisc., and is of a type providing what is known as a twisted nematic field effect (TNFE) display. Gates 100, 102, 104, 106 are so-called NAND qates. Gates 108, 110, 112, 114 are so-called EXCLUSIVE-OR (EX-OR) gates. Conveniently, the group of NAND gates 100-106 utilized in the circuit can be a quad Model 4011B COS/MOS integrated circuit, and the group of EX-OR gates 108-114 can be a Quad Model 4070B COS/MOS integrated circuit, both manufactured by SGS and obtainable from Electronic Sources, Inc. of Bellevue, Wash. Components 116, 118, 120 are silicon diodes type 1N4002.

The two NAND gates 100, 102 and associated resistors and capacitor function as a square wave generator 122 providing a square wave voltage output at 30 Hz to the back plane of the display LCD and to one input of each of the gates 110, 112, 114

As will be understood, the nature of the manner of operation of the gas sensor 30 is such that the resistance thereof increases in the presence of hydrocarbon vapor, and therefor the voltage at input 124 of gate 108 will increase when the circuit is activated and when hydrocarbon vapor is present in the pod SP. Factory pre-set variable resistor 126 is provided as a means for varying the sensitivity of the gas sensor 30, as desired. As will also be understood, when water is present in the pod SP, the galvanic cell comprising zinc electrode 40 and carbon electrode 46 becomes active with the water acting as a weak electrolyte, providing a negative voltage at input 128 of NAND gate 106.

Considering now the manner of operation of the circuitry shown in FIG. 7, the first operating state to be addressed is what may be termed the "normal" state i.e. with activation of the circuit by illumination the solar cell ASC and with neither measurable hydrocarbon vapor nor water in the sensor pod SP. In such operating state the square-wave at output 136 from squared wave generator 122 is applied to one input of each of the EX-OR gates 110, 112, 114 and to the back plane of the display LCD. With no hydrocarbon vapor sensed by the gas sensor 30 the voltage input to EX-OR 108 at input 124 is relatively low so the voltage at output 130 from the gate 108 is relatively low and the input to gate 110 at input 132 is relatively low with the output from the gate 110 at output 134 being in phase with the square wave output at 136 applied to the back plane of the display LCD. With the square waves at the display LCD input 134 and on the back plane of the LCD both in phase, as will be understood, the "HYDROCARBON" indication 20 is not visible.

Further considering the "normal" state of affairs in the electrical circuit shown in FIG. 7, when there is no liquid water present in the sensor pod SP, no current flows between the galvanic cell electrodes 40, 46 and the output from the carbon electrode 40 at prong 52 and at input 128 of the NAND gate 106 is relatively high since there is no voltage drop across resistor 140, one end of which is at the potential of the solar cell ASC output, i.e. three volts. Thus, in such condition both inputs to the NAND gate 106 are at the same relatively high potential and the output at 142 which is the second input to EX-OR gate 114 is relatively low and the output 144 from the gate 114 is thus also in phase with the input 136 thereto and in phase with the square wave on the back plane of the LCD display, with the result that the indication (WATER, at 22) is not visible. In such "normal" condition, also, the input 150 to the NAND gate 104 is fixed at the activating potential and the voltage at input 152 thereof, having been derived from the gate 108 output 130 through isolating diode 118, is relatively low since the output 130 from EX-OR gate 108 is at that time relatively low. With the inputs 150, 152 being different, the output 154 from gate 104 is relatively high and the output 156 from EX-OR gate 112 is accordingly out of phase with the input 136 and the back plane voltage, and the "OK" visual designation 24 is visible.

Next considering the circuit condition when the gas sensor 30 in the sensor pod SP responds to the presence of hydrocarbon gas. In such event, the resistance through the sensor increases, the voltage at input 124 to the EX-OR gate 108 is relatively increased and its output 130 is increased in potential as is the input to EX-OR gate 110, the effect of which is to render the output 134 from gate 110 out of phase with its input square wave 136 and the input square wave 136 to the back plane of the display LCD, with the result that the "HYDROCARBON" indication 20 becomes visible. At the same time, with the increase in voltage at output 130 from the EX-OR gate 108, the input 152 to NAND gate 104 increases, resulting in a lowering of the voltage at its output 154 and at the input to EX-OR gate 112, with the result that the output 156 from gate 112 is rendered in phase with the input thereto at 136 and with the voltage on the back plane of the display LCD, which renders the "OK" indication 24 not visible. As will be understood also, no change occurs in the state of non-visibility of the "WATER" indication 22 because there has been no change in the inputs to NAND gate 106 and because the reduction in voltage occurring at gate 108 output 130 and at gate 104 input 152 is blocked from the input to EX-OR gate 114 by blocking diode 120.

Next consideration is given to the condition of the circuit shown in FIG. 7 when there is liquid water in the pod SP without hydrocarbon vapor being present. In such conditions an electromotive potential develops between the galvanic cell electrodes 40, 46 which renders the output from the carbon electrode 40 at prong 52 and input 128 to NAND gate 106 relatively low as compared with the input 150 thereto, which increases the potential of the output from the NAND gate 106 and the input 142 to the EX-OR gate 114, which renders the output 144 out of phase with the input 136 to the gate 114 and with the wave form appearing on the back plate of the display LCD, which renders the "WATER" indication 22 visible. At the same time, with the voltage at the input 142 to the gate 114 relatively high, the voltage thereon is conducted through diode 120 to the input 152 of NAND gate 104 which lowers the input 154 to the EX-OR gate 112, in turn rendering the output 156 from the gate 112 10 in phase with its input 136 which renders the "OK" indicator 24 not visible. In such condition the "HYDROCARBON" indicator 20, not having been visible, remains not visible. Should there be both hydrocarbon vapor and water present in the pod SP, which can occur by reason of the pod filling with water only to the extent of the uppermost slot 70 which still can leave a pocket of gas within the pod or which can occur by reason of sufficient hydrocarbon gas being trapped in the water, then both the "HYDROCARBON" visual indication 20 and the "WATER" indication 22 will be visible. This is because the square wave voltage input and output at 136 and 144 of EX-OR gate 114 are out of phase as previously discussed. Then, also, with the voltage at input 124 to EX-OR gate 108 relatively increased by reason of the gas sensed by sensor 30, the output 130 goes up and the input 132 to gate 110 goes up and the respective input 136 and output 134 from gate 110 are out of phase with the "HYDROCARBON" indication 20 thus also rendered visible.

From the accompanying drawings and foregoing description of the preferred embodiment of the invention, various modifications, adaptations and other applications of the invention will be apparent to those skilled in the art. Thus, for example, while the electrical circuitry disclosed involves an amorphous silicon solar cell generating a nominal operative voltage of 3 volts, it will be apparent other solar cells and other operating voltages can be employed consistent with the objective of low power and self-contained circuitry. Alternatively, also, other gas sensor components of a type generating a variable electrical sensor responsive to varying hydrocarbon gas presence can be used in lieu of or in addition to the specific gas sensor disclosed. Additionally, other galvanic cell components capable of use in a water level detection system can be employed, such as a magnesium/carbon combination, although the zinc/carbon combination selected in the preferred embodiment is preferred because of the characteristic of good sensitivity at very low power consumptions. As will also be apparent, while the preferred embodiment is of a form specifically adapted to be used with a wellpipe or standpipe of a tank installation and to be simply withdrawable therefrom, it will be understood the components of the system can in certain instances be fixed installations. Various other adaptations and applications of detection in monitoring systems characteristic of the present invention will be apparent, within the scope of the following claims.

What is claimed is:

1. A low-power, combination hydrocarbon and water level sensor system for use to monitor the underground environment in connection with an underground storage tank, industrial waste site, or the like, said system comprising:

a sensor pod including an adsorptive gas vapor sensor for hydrocarbon detection and a galvanic cell for liquid water detection, a solar cell, and electrical circuitry powered by said solar cell and including an LCD display indicating the conditions of said gas vapor sensor and said galvanic cell, said sensor pod being locatable in the underground environment and said solar cell being located for direct above ground exposure so as to be operable by above ground light and said LCD display being located so as to be directly viewable from above ground.

2. For use in combination with an underground tank which includes a well pipe or standpipe adjacent the tank and extending from an upper location near ground level to a lower location near the bottom of the tank, a combination hydrocarbon and water level sensor system arranged to monitor the presence or absence of hydrocarbon vapor and liquid water in the region near the bottom of the well pipe or standpipe, said system comprising a sensor pod including a hydrocarbon gas vapor sensor means providing an electrical output which is variable responsive to the presence or absence of such vapor, and a galvanic cell for liquid water detection, such pod including openings therein providing means for ingress and egress of gas and water, a well cap fittable at the top of the well-pipe or standpipe, electrical cable means suspending said sensor pod from said well cap, an LCD display at said upper location providing a visual output of the state of said gas vapor sensor and said galvanic cell, and a solar cell at said upper location for powering said gas vapor sensor and said galvanic cell.

3. A sensor system according to claim 2, wherein said solar cell comprises an amorphous silicon solar cell.

4. A sensor system according to claim 2 wherein said galvanic cell comprises zinc and carbon electrodes.

5. A sensor system according to claim 2, wherein said gas vapor sensor is of the gas adsorptive type.

6. A sensor system according to claim 2, wherein said LCD display is a part of said well cap.

7. A sensor system according to claim 2, wherein said solar cell is a part of said well cap.

8. A sensor system according to claim 2, wherein said LCD display and said solar cell are arranged for viewing in the top portion of said well cap, said solar cell is an amorphous silicon solar cell having an operative output of about three volts, and wherein the electrical circuitry receiving input from the sensors and controlling the LCD display comprises C/MOS components.

9. A system according to claim 8, wherein the LCD display comprises a visual showing of the letters "HYDROCARBON" when the gas vapor sensor senses hydrocarbon gas in the well-pipe, "WATER" when the galvanic cell senses liquid water in the well-pipe, and "OK" when neither hydrocarbon gas nor liquid water is present in the sensor pod.

* * * * *